(12) United States Patent
Obayashi et al.

(10) Patent No.: US 8,122,988 B2
(45) Date of Patent: Feb. 28, 2012

(54) VEHICULAR COOLING DEVICE SUPPORTING APPARATUS

(75) Inventors: Akira Obayashi, Toyota (JP); Akiyoshi Kato, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 327 days.

(21) Appl. No.: 12/422,452

(22) Filed: Apr. 13, 2009

(65) Prior Publication Data
US 2009/0266633 A1    Oct. 29, 2009

(30) Foreign Application Priority Data
Apr. 28, 2008    (JP) .................................. 2008-117792

(51) Int. Cl.
*B60K 11/04* (2006.01)
(52) U.S. Cl. ...................................... 180/68.4; 180/68.6
(58) Field of Classification Search ................. 180/68.1, 180/68.4, 68.6, 291, 296, 312; 123/41.43
See application file for complete search history.

(56) References Cited

U.S. PATENT DOCUMENTS

| | | | | |
|---|---|---|---|---|
| 4,538,697 A * | 9/1985 | Muroi et al. | ................. | 180/68.4 |
| 4,566,407 A * | 1/1986 | Peter | .......................... | 123/41.48 |
| 4,579,184 A * | 4/1986 | Hiramoto | ..................... | 180/68.4 |
| 4,619,313 A * | 10/1986 | Rhodes et al. | .................. | 165/67 |
| 4,766,968 A * | 8/1988 | Matsunaga | ................... | 180/68.4 |
| 4,770,234 A * | 9/1988 | Hiraoka et al. | ................. | 165/69 |
| 4,829,409 A * | 5/1989 | Funkey | ......................... | 362/496 |
| 5,287,940 A * | 2/1994 | Ogawa et al. | ................. | 180/68.4 |
| 5,544,714 A * | 8/1996 | May et al. | ..................... | 180/68.4 |
| RE35,710 E * | 1/1998 | Shinmura | ..................... | 165/140 |
| 6,029,345 A * | 2/2000 | Christensen | ............... | 29/888.01 |
| 6,260,609 B1 * | 7/2001 | Takahashi | ....................... | 165/69 |
| 6,318,450 B1 * | 11/2001 | Acre | ............................... | 165/67 |
| 6,412,581 B2 * | 7/2002 | Enomoto et al. | ............. | 180/68.4 |
| 6,675,921 B2 * | 1/2004 | Brown | ......................... | 180/68.4 |

(Continued)

FOREIGN PATENT DOCUMENTS

JP     3-59420 U     6/1991

(Continued)

OTHER PUBLICATIONS

Japanese Office Action dated Aug. 3, 2010.

*Primary Examiner* — J. Allen Shriver, II
*Assistant Examiner* — Brodie Follman
(74) *Attorney, Agent, or Firm* — Finnegan, Henderson, Farabow, Garrett & Dunner, LLP

(57) ABSTRACT

A vehicular cooling device supporting apparatus has a radiator support lower 14 formed with a plurality of support-side connecting portions 32 and 34 for altering connecting positions to radiator support sides 16 and 18. This enables a layout position of a radiator main body 20 to be altered depending on size of an engine to use component parts in common. Placing the radiator main body 20 in a rearward position when the engine is small in size can suppresses damage to the radiator main body 20 upon collision of a vehicle at a low vehicle speed. In this case, it is suffice for the connecting positions of the radiator support lower 14 to the radiator support sides 16 and 18 to be altered in a vehicle fore and aft direction. Thus, the cooling device supporting apparatus can be constructed simply at the low cost with a minimum number of component parts.

8 Claims, 4 Drawing Sheets

U.S. PATENT DOCUMENTS

| | | | |
|---|---|---|---|
| 6,684,937 B2* | 2/2004 | Lenz et al. | 165/41 |
| 6,742,615 B2* | 6/2004 | Cristante et al. | 180/68.4 |
| 6,957,711 B2* | 10/2005 | Jung | 180/68.4 |
| 7,036,617 B2* | 5/2006 | Harada | 180/68.4 |
| 7,108,092 B2* | 9/2006 | Suwa et al. | 180/68.4 |
| 7,117,926 B2* | 10/2006 | Mori et al. | 165/67 |
| 7,150,335 B2* | 12/2006 | Sasano et al. | 180/68.4 |
| 7,243,751 B2* | 7/2007 | Shigematsu | 180/68.4 |
| 7,350,609 B2* | 4/2008 | Udo et al. | 180/68.4 |
| 7,637,514 B2* | 12/2009 | Kim | 280/124.109 |
| 7,640,966 B2* | 1/2010 | Maeda et al. | 165/41 |
| 7,703,566 B2* | 4/2010 | Wilson et al. | 180/68.4 |
| 7,766,112 B2* | 8/2010 | Kapadia et al. | 180/68.4 |
| 7,861,988 B2* | 1/2011 | Hamida et al. | 248/232 |
| 7,882,913 B2* | 2/2011 | Maeda et al. | 180/68.4 |
| 7,926,869 B2* | 4/2011 | Kim | 296/187.11 |
| 7,942,223 B2* | 5/2011 | Obayashi et al. | 180/68.4 |
| 2001/0001994 A1* | 5/2001 | Enomoto et al. | 180/68.4 |
| 2001/0019098 A1* | 9/2001 | Guyomard | 248/562 |
| 2001/0040026 A1* | 11/2001 | Halm | 165/153 |
| 2002/0056541 A1* | 5/2002 | Kokubunji et al. | 165/67 |
| 2002/0063003 A1* | 5/2002 | Cristante et al. | 180/68.4 |
| 2002/0157885 A1* | 10/2002 | Brown | 180/68.4 |
| 2003/0146030 A1* | 8/2003 | Harada | 180/68.4 |
| 2004/0011577 A1* | 1/2004 | Jung | 180/68.4 |
| 2004/0188155 A1* | 9/2004 | Fujieda | 180/68.4 |
| 2004/0195020 A1* | 10/2004 | Suwa et al. | 180/68.4 |
| 2004/0200598 A1* | 10/2004 | Hitt et al. | 165/69 |
| 2004/0211607 A1* | 10/2004 | Sasano et al. | 180/68.4 |
| 2005/0077095 A1* | 4/2005 | Shigematsu | 180/68.4 |
| 2005/0121170 A1* | 6/2005 | Maeda et al. | 165/67 |
| 2005/0139411 A1* | 6/2005 | Tsushima | 180/312 |
| 2005/0230162 A1* | 10/2005 | Murayama et al. | 180/68.1 |
| 2005/0279547 A1* | 12/2005 | Udo et al. | 180/68.4 |
| 2006/0081354 A1* | 4/2006 | Miura et al. | 165/41 |
| 2006/0169442 A1* | 8/2006 | Cristante et al. | 165/121 |
| 2006/0207815 A1* | 9/2006 | Vandekerkhof | 180/68.4 |
| 2006/0213639 A1* | 9/2006 | Kobayashi et al. | 165/67 |
| 2006/0213640 A1* | 9/2006 | Matsuoka et al. | 165/67 |
| 2006/0237175 A1* | 10/2006 | Hara | 165/140 |
| 2007/0068716 A1* | 3/2007 | Kunikata | 180/68.4 |
| 2007/0119564 A1* | 5/2007 | Contet | 165/67 |
| 2007/0144713 A1* | 6/2007 | Sugimoto et al. | 165/140 |
| 2007/0246280 A1* | 10/2007 | Maeda et al. | 180/68.4 |
| 2007/0267236 A1* | 11/2007 | Wilson et al. | 180/68.4 |
| 2008/0185200 A1* | 8/2008 | Streeter | 180/68.4 |
| 2008/0308333 A1* | 12/2008 | Kapadia et al. | 180/68.4 |
| 2009/0159353 A1* | 6/2009 | Kerkewitz | 180/68.4 |
| 2009/0266633 A1* | 10/2009 | Obayashi et al. | 180/68.4 |
| 2009/0266634 A1* | 10/2009 | Obayashi et al. | 180/68.4 |
| 2010/0163324 A1* | 7/2010 | Jyoutaki et al. | 180/68.1 |
| 2010/0300783 A1* | 12/2010 | Seegert et al. | 180/68.4 |
| 2010/0320020 A1* | 12/2010 | Hwang | 180/68.4 |

FOREIGN PATENT DOCUMENTS

| | | |
|---|---|---|
| JP | 2006-327259 | 12/2006 |
| JP | 2007-331440 | 12/2007 |

* cited by examiner

VEHICULAR COOLING DEVICE SUPPORTING APPARATUS

This application is based on Japanese Patent Application No. 2008-117792 filed on Apr. 28, 2008, and content thereof is incorporated therein for reference.

FIELD OF THE INVENTION

This invention relates to a vehicular cooling device supporting apparatus which can alter layout position of the cooling device corresponding to size of an engine and which is simple in structure.

DESCRIPTION OF THE RELATED ART

There has heretofore been known vehicular cooling device supporting apparatus for supporting a vehicle cooling device (for example, radiator), one type of which includes a radiator support upper, a radiator support lower, and a pair of radiator support sides. The radiator support upper is placed in a lateral direction of a vehicle, i.e., vehicle lateral direction, and has an upper mounting portion for fixing an upper portion of the cooling device. The radiator support lower is placed below the radiator support upper in the vehicle lateral direction and provided with a lower mounting portion for fixing a lower portion of the cooling device. The pair of radiator support sides are vertically extended and spaced from each other in the vehicle lateral direction to straddle between the radiator support upper and the radiator support lower for unitarily connecting them. The vehicular cooling device supporting apparatus supports the cooling device in an approximately quadrangular-shaped space surrounded by the radiator support upper, the radiator support lower and the pair of radiator support sides.

A vehicular cooling device supporting apparatus disclosed in Patent Document 1 (Japanese Patent Publication 2006-327259) is one example, which is arranged to support both an air-conditioning condenser and a radiator main body as the cooling devices. The radiator support upper and the radiator support lower have a plurality of bracket groups acting as the upper mounting portion and the lower mounting portion, respectively, for mounting the cooling device. Thus, layout position of the cooling device can be altered depending on size of an engine.

However, in the conventional vehicular cooling device supporting apparatus, there is needed the plurality of bracket groups acting as the upper mounting portion and the lower mounting portion. This increases the number of component parts which resultantly leads to increase in manufacturing cost and increase in weight.

SUMMARY OF THE INVENTION

The present invention has been completed with the above view in mind and has an object to provide a vehicular cooling device supporting apparatus which can be constructed simply with a minimum number of component parts at a low cost, and in which a layout position of the cooling device can be altered depending on size of an engine.

For achieving the above object, a first aspect of the present invention relates to a vehicular cooling device supporting apparatus, comprising a radiator support upper disposed in a lateral direction of a vehicle i.e., a vehicle lateral direction and having an upper mounting portion for fixing an upper portion of a cooling device; a radiator support lower placed below the radiator support upper so as to extend in the vehicle lateral direction and having a lower mounting portion for fixing a lower portion of the cooling device; and a pair of radiator support sides vertically extended and spaced in the vehicle lateral direction so as to straddle between the radiator support upper and the radiator support lower for unitarily connecting the radiator support upper and the radiator support lower. The vehicular cooling device supporting apparatus has an approximately square-shaped space surrounded by the radiator support upper, the radiator support lower and the pair of radiator support sides for supporting therein the cooling device.

The radiator support lower has a pair of connecting areas, connected to the pair of radiator support sides, each having a plurality of support-side connecting portions to be connected to a lower end of the radiator support side at one of plural positions displaced in a fore and aft direction of a vehicle i.e., a vehicle fore and aft direction. The lower mounting portion is disposed (i) to have a first position located forward of the upper mounting portion in the vehicle fore and aft direction when the radiator support lower is connected to the radiator support sides in a frontmost position in the vehicle fore and aft direction, and (ii) to have a second position located rearward of the upper mounting portion in the vehicle fore and aft direction when the radiator support lower is connected to the radiator support sides in a rearmost position in the vehicle fore and aft direction.

A second aspect of the present invention is featured by that, in the first aspect, at least one of the upper mounting portion and the lower mounting portion is a retaining bore having a cylindrical protrusion protruding in a normal direction or a vertical direction of a vehicle, i.e., a vehicle normal direction or vehicle vertical direction, and a elastic body having an outer circumferential surface formed with annular groove engaged with a cylindrical protrusion is unitarily engaged with the retaining bore, so that the cooling device is mounted to the radiator support upper and the radiator support lower via the elastic body. The cylindrical protrusion has a tapered shape with a diameter decreasing in a direction opposite to the cooling device, and allows placement and inclination of the elastic body to swingably displace in the vehicle fore and aft direction when placement and inclination of the cooling device varies corresponding to difference in the connecting position between the radiator support lower and the radiator support sides.

A third aspect of the present invention is featured by that, in the first or second aspect, the plurality of support-side connecting portions include two sets of plural connecting holes placed adjacent to each other in the vehicle fore and aft direction, which allow the radiator support lower to be connected to lower ends of the radiator support sides at one of two positions displaced in the vehicle fore and aft direction. The lower mounting portion is located between a center position of a first set of the plural connecting holes and a center position of a second set of the plural connecting holes in the vehicle fore and aft direction.

In the vehicular cooling device supporting apparatus, the radiator support lower having the plural support-side connecting portions displaced i.e. deviated in the vehicle fore and aft direction, can alter connecting position to the radiator support sides in the vehicle fore and aft direction. The cooling device supporting apparatus allows the radiator support lower to be placed forward when an engine is large in size, and allows the radiator support lower to be placed rearward when the engine is small in size. Thus, a layout position of the cooling device can be altered depending on the size of the engine. As a result, component parts can be used in common for both the engine of large size and the engine of small size.

Further, placing the cooling device rearward of the engine having the small size can suppress damage to the cooling device upon a collision of vehicle at low speed. In this case, it is suffice for the cooling device support lower to be merely altered in the connecting positions to the radiator support sides in the vehicle fore and aft direction. This can provide a further simplified structure and low cost with a minimum number of component parts, compared with that of the vehicular cooling device supporting apparatus disclosed in Patent Document 1.

With the radiator support lower being connected to the radiator support sides in the frontmost side, the lower mounting portion of the radiator support lower is placed forward of the upper mounting portion of the radiator support upper. With the radiator support lower being connected to the radiator support sides in the rearmost position, the lower mounting portion of the radiator support lower is placed rearward of the upper mounting portion of the radiator support upper.

Therefore, the cooling device, having the upper portion and the lower portion mounted on the upper mounting portion and the lower mounting portion respectively, can have or can be disposed in a variable placement and inclination between a backward inclination with a lower portion protruding forward and a forward inclination with the lower portion retracted rearward with respect to a vehicle normal direction i.e. a vehicle vertical direction. This can adapt to the vehicle with variety of the engine sizes without causing any change in mounting structures of the upper and lower mounting portion or without making any remarkable design change, compared with the conventional supporting apparatus which supports the cooling device with a small inclination, substantially vertical.

In a second aspect of the present invention, for instance, at lease one of the upper mounting portion and the lower mounting portion is a retaining bore having a cylindrical protrusion protruding in a normal direction of a vehicle i.e., a vehicle normal direction, and a elastic body having an outer circumferential surface formed with annular groove engaged with the cylindrical protrusion is unitarily engaged with the retaining bore, so that the cooling device is mounted to the radiator support upper via the elastic body. In this case, the cylindrical protrusion is formed in tapered shape, with a diameter decreasing upward. This permits the elastic body to swingably displace in placement and inclination in the vehicle fore and aft direction, even if the cooling device varies in the placement and inclination between the backward inclination and the forward inclination, corresponding to a difference in a connecting position between the radiator support lower and the radiator support sides.

Thus, the cooling device can be comfortably well mounted on the upper mounting portion regardless of the placement and inclination change thereof. In addition, the elastic body employed in a usual supporting apparatus in which the cooling device is disposed in an approximately vertical direction can be used, enabling component parts to be used in common. The lower mounting portion can be constructed in up-and-down symmetry to the upper mounting portion, rendering the same advantageous effects as those of the upper mounting portion.

A third aspect of the present invention is directed to a case wherein the radiator support lower has two sets of plural connecting holes placed adjacent to each other in the vehicle fore and aft direction, which act as support-side connecting portions to allow the radiator support lower to be connected to the radiator support sides at either one of the two positions displaced in the vehicle fore and aft direction. In this case, the lower mounting portion is located in an area located between a center position of a first set of the plural connecting holes and a center position of a second set of the plural connecting holes in the vehicle fore and aft direction. Therefore, it may suffice for the layout positions of the upper mounting portion to be set for instance to areas near the center of the radiator support sides to be connected to the support-side connecting portions in the vehicle fore and aft direction.

With such a structure, when the radiator support lower is connected to the radiator support sides in the forward position, the upper mounting portion can have or is disposed in one position located rearward of the lower mounting portion. When the radiator support lower is connected to the radiator support sides in the rearward position, the upper mounting portion can have or is disposed in other position located forward of the lower mounting portion. As a result, not only the positional relationship between the upper mounting portion and the lower mounting portion can be simply determined, but also the supporting apparatus can be constructed compact in the vehicle fore and aft direction.

DETAILED DESCRIPTION OF THE PREFERRED EMBODIMENTS

Figure 1A:
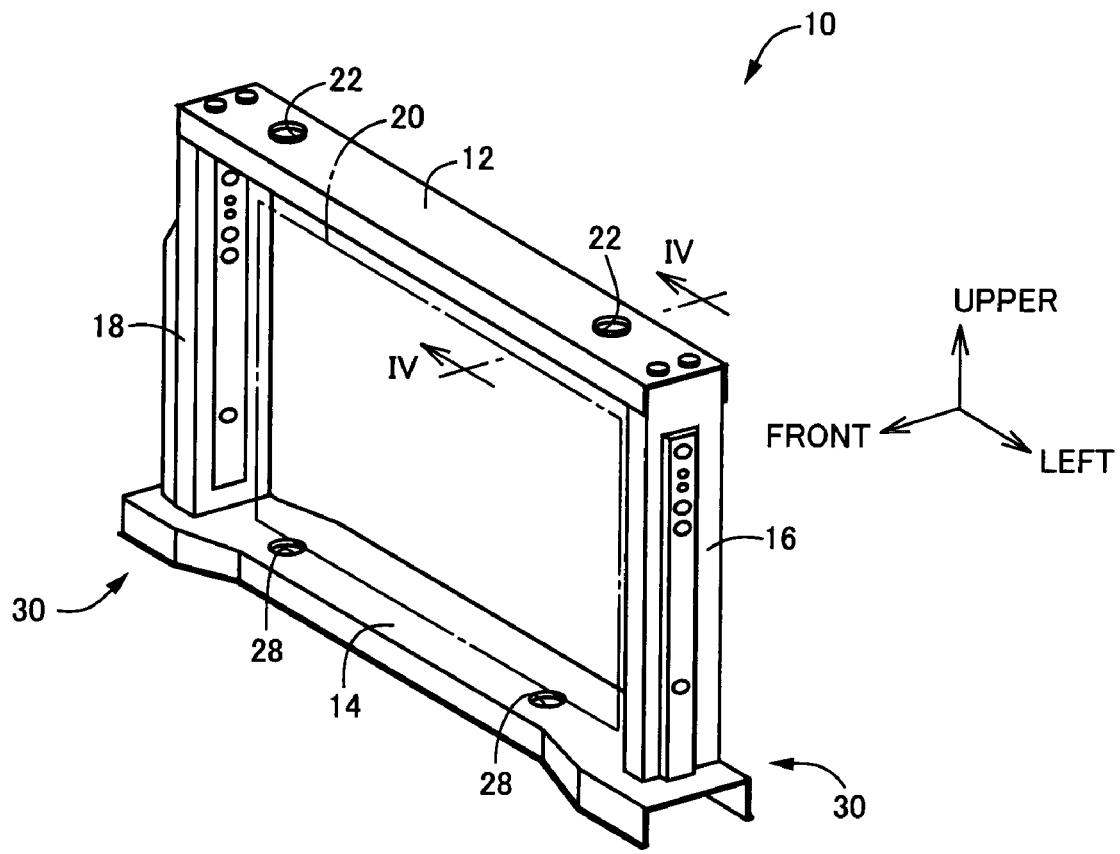
FIGS. 1A and 1B are views illustrating a vehicular cooling device supporting apparatus according to one embodiment of the present invention, with FIG. 1A being a perspective view and FIG. 1B being a plan view showing a left end portion of a radiator support lower.

A cooling device supported with a vehicular cooling device supporting apparatus of the present invention is typically comprised of a radiator main body that cools coolant fluid such as engine coolant or the like. However, the present invention can be applied to a vehicular cooling device supporting apparatus which support an another cooling device such as an air conditioning condenser of an air conditioning equipment or the like. In addition, the vehicular cooling device supporting apparatus can be constructed to support a plurality of cooling devices including the radiator main body, the air conditioning condenser and the like.

A radiator support upper is unitarily fixed to for instance a frame, etc., of a vehicle, or may be integrally formed with the frame, etc. In any case, the radiator support upper has predetermined positions to which a pair of radiator support sides are unitarily fixed by coupling means or welding, etc., such as bolts or the like. To lower ends of the pair of radiator support sides, a radiator support lower is unitarily connected so as to straddle them. The radiator support lower has plural support-side connecting portions provided in each of connecting positions, between the radiator support lower and the pair of radiator support to alter the connecting positions therebetween in a vehicle fore and aft direction. The connecting positions between the radiator support lower and the pair of radiator support sides have the same relationships with respect to the vehicle fore and aft direction. That is, if the one radiator support side has the connecting position placed in the forward position of the vehicle, then the connecting position of the other radiator support side is placed forward of the vehicle. On the contrary, if the one radiator support side has the connecting position placed in a rearward position of the vehicle, then the connecting position of the other radiator support side is placed rearward of the vehicle.

Description will be made of a positional relationship between one or plural the upper mounting portion(s) of the radiator support upper and one or plural lower mounting portion(s) of the radiator support lower in the vehicle fore and aft direction. Position of the lower mounting portion varies depending on the connecting positions between the radiator support lower and the radiator support sides. It may suffice for the upper mounting portion to be positioned between the lower mounting portion for the radiator support lower to be connected to the radiator support sides in the forward position, and the lower mounting portion for the radiator support lower to be connected to the radiator support sides in the rearward position. Determining the upper mounting portion to be positioned at a central area, of the lower mounting portion placed in the forward and rearward positions in the vehicle fore and aft direction results in a symmetric placement and inclination relation of the cooling device to a normal i.e. vertical direction. This can achieve a minimized inclining angle of the cooling device with respect to the normal direction with ensuring predetermined displacement amount of the lower mounting portion.

A plurality of support-side connecting portions are located, likewise the third aspect of the present invention for instance, in two positions adjacent to each other in the vehicle fore and aft direction. However, the support-side connecting portions may be located in more than three areas to allow the connecting positions of the radiator support lower to be altered in more than three stages in the fore and aft direction. Thus, the cooling device can have or can be disposed in variable inclinations in more than three stages in the vehicle fore and aft direction.

According to the second aspect of the present invention, one or plural tapered-shape cylindrical protrusion(s) can be simply formed a burling bore(s) upon press working, simultaneous with press-working the radiator support upper. However, the tapered-shape cylindrical protrusions separately formed may be unitarily fixed to the radiator support upper by welding or the like. Thus, various modifications may be adopted.

In carrying out the first aspect of the present invention, the cylindrical protrusion is not necessarily provided, and a bracket or the like may be provided to fix the upper end of the cooling device by bolts. Thus, various modifications may be adopted.

According to the third aspect of the present invention, the support-side connecting portions of the radiator support lower are comprised of plural connecting holes to be unitarily connected to the pair of radiator support sides by coupling means such as, for instance, a plurality of bolts. However, in implementing another aspect of the present invention, coupling means like bolts may be provided in place of the connecting holes. In another alternative, it may suffice to provide a single connecting hole or a coupling member utilizing a positioning pilot pin or pilot hole. Thus, various modifications may be possibly made. Also, positioning protrusions or positioning concaved portions may be provided as support-side connecting portions to be positioned to lower ends of the radiator support sides at plural positions spaced in the vehicle fore and aft direction. Thus, the support-side connecting portions can be unitarily connected to the radiator support sides by welding means such as spot-welding or the like.

Further, according to the third aspect of the present invention, the lower mounting portion is disposed between the respective center positions of the two sets of the plural connecting holes in the vehicle fore and aft direction, i.e., between the support-side connecting portions placed in a frontmost end and the support-side connecting portions placed in a rearmost end. However, in implementing another aspect of the present invention, the lower mounting portion may be located forward of the frontmost support side connecting portions in front of the vehicle, or it may be also located rearward of the rearmost support side connecting portions in rear of the vehicle.

EMBODIMENT

Now, one embodiment of the present invention will be described below in detail with reference to the accompanying drawings.

Figure 1B:
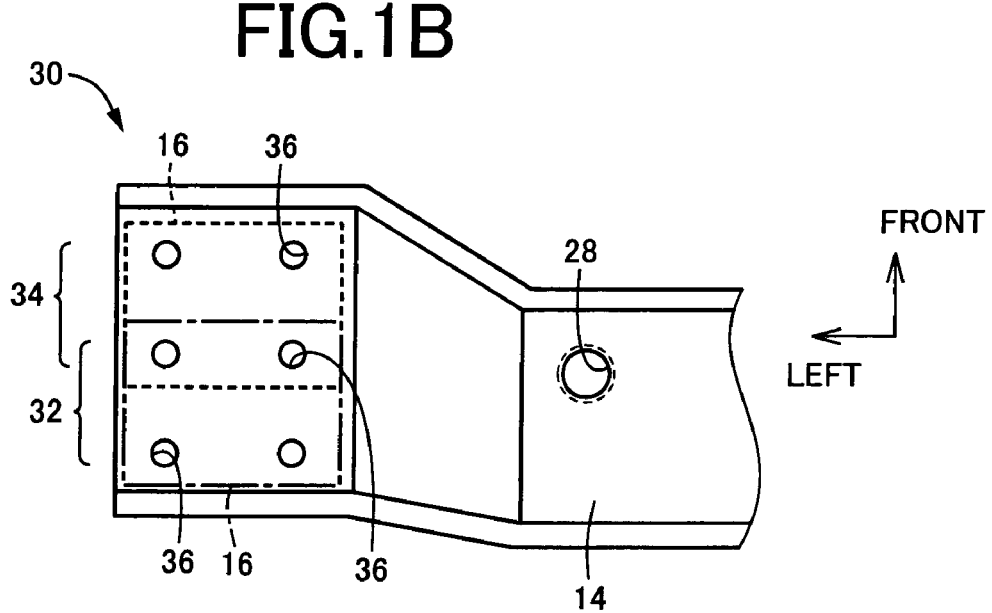

FIGS. 1A and 1B are views illustrating a vehicular cooling device supporting apparatus 10 according to one embodiment of the present invention. FIG. 1A is a perspective view of the vehicular cooling device supporting apparatus 10, and FIG. 1B is a plan view showing a left end portion of a radiator support lower 14. The vehicular cooling device supporting apparatus 10 includes a radiator support upper 12 transversely placed in a approximately horizontal direction of the vehicle, a radiator support lower 14 placed below the radiator support upper 12 in approximately parallel thereto, and a pair of (left and right) radiator support sides 16 and 18. The left and right radiator support sides 16 and 18 stand in an upper and lower direction (substantially vertical direction) and are spaced from each other in a vehicle lateral direction, that is, laterally in the vehicle. The pair of radiator support sides 16 and 18 straddle i.e. span between the radiator support upper 12 and the radiator support lower 14 to connect them.

The radiator support upper 12, the radiator support lowers 14 and the left and right radiator support sides 16 and 18 form a frame body of an approximately square shape. A radiator main body 20 for cooling a cooling fluid i.e. coolant for cooling an engine is integrally mounted on the frame body to be supported in a square space surrounded with the frame body formed in the approximately square shape. The radiator main body 20 corresponds to a cooling device of the present invention.

Figure 4A:
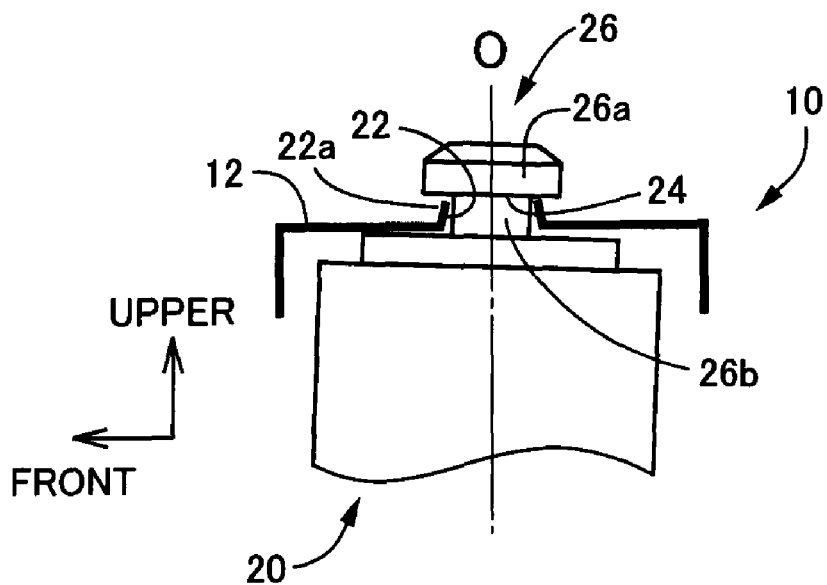
FIGS. 4A and 4B are views illustrating a state in which an upper portion of a radiator main body is mounted on the radiator support upper by a elastic body fitted to a retaining bore of an upper mounting portion, with FIG. 4A showing one case in which the radiator support lower is connected to the radiator support side in a forward position and FIG. 4B showing another case in which the radiator support lower is connected to the radiator support side in a rearward position.

The radiator support upper 12 is a press-worked product formed in an approximately U-shaped elongate configuration in cross section, as shown in FIG. 4A. The radiator support upper 12 is approximately horizontally placed in the vehicle lateral direction with a U-shaped open side directed downward to be integrally mounted on a frame (not shown) of the vehicle. In addition, the radiator support upper 12 has a pair of vertically penetrating retaining bores 22, formed in laterally spaced positions, to act as an upper-side mounting portions for fixing an upper end of the radiator main body 20. The retaining bores 22, taking the form of hurling bores formed on a flattened portion of the radiator support upper 12, i.e., a back side portion of the U-shaped configuration, is disposed in an approximately horizontal inclination, when the radiator support upper 12 is mounted on the vehicle. The burling bores are simultaneously formed in the press forming of the radiator support upper 12. Each of the retaining bores 22 is integrally formed with upwardly protruding cylindrical flanges 22a (refer to FIG. 4A to be explained next), on which the upper portion of the radiator main body 20 is integrally mounted via elastic bodies made of rubber or the like.

To the retaining bores 22, the upper portions of the radiator main bodies 20 are unitary connected via elastic bodies 26 which are made of a rubber and are disposed in a non-detachable manner. Each of the elastic bodies 26 has on an outer peripheral surface thereof an annular groove 24 with which the cylindrical protrusion 22a is engaged. Formation of the annular groove 24 provides the elastic body 26 a head portion 26a having large diameter and a neck portion 26b having small diameter. The neck portion 26b fixed to the radiator main body 20 is engaged with the cylindrical protrusion 22a and the head portion 26a is protruded from the cylindrical protrusion 22a.

Figure 4B:
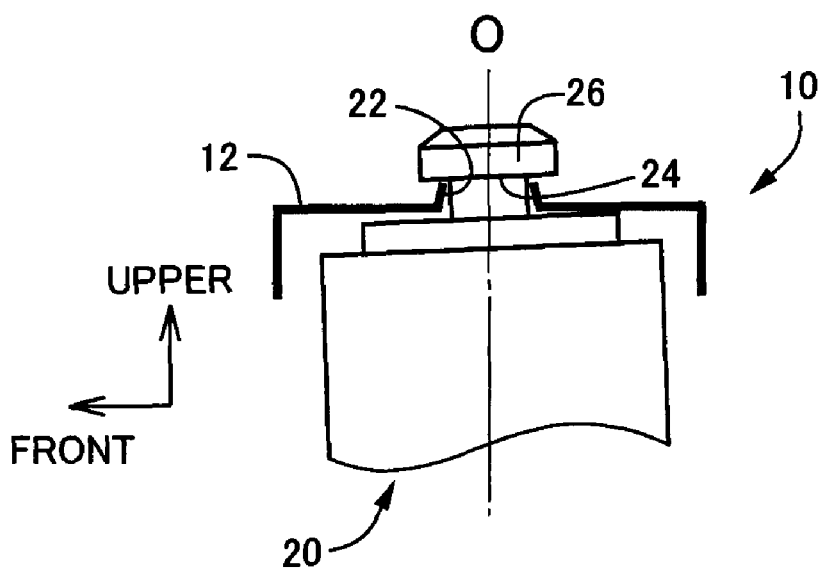

As shown in FIGS. 4A and 4B corresponding to sectional views cut along a line IV-IV in FIG. 1A and showing the radiator main body 20 mounted, the cylindrical protrusion 22a of the retaining hole 22 has a tapered shape with a diameter decreasing upward. This allows placements and inclinations of the elastic body 26 and the radiator main body 20 to swingably displace in the vehicle fore and aft direction, that is the fore and aft direction of the vehicle within a predetermined range, with interposing a normal line O approximately coinciding with a center line of the retaining hole 22.

The left and right radiator support sides 16 and 18 are press-worked products formed in the same press forming process as that of the radiator support upper 12. The radiator support sides 16 and 18 are spaced from each other in a vehicle lateral direction by a distance corresponding to a length of the radiator support lower 14, and each has an upper end unitarily fixed to the radiator support upper 12 by fixture means such as bolts.

The radiator support lower 14 is a press-worked product formed in an approximately U-shaped elongate configuration in cross section likewise the radiator support upper 12, and is approximately horizontally placed in the vehicle lateral direction with a U-shaped open side directed downward in placement and inclination. The radiator support lower 14 has both ends placed on a longitudinal direction, which are unitarily connected to lower ends of the radiator support sides 16 and 18. The radiator support lower 14 has a pair of retaining bores 28 formed at left and right positions laterally spaced from each other to act as lower mounting portions for fixing lower portions of the radiator main body 20. Likewise the retaining bores 22 of the upper mounting portions, the retaining bores 28 take the form of burling bores formed on a flattened portion, i.e., a back side portion of the U-shaped configuration to be approximately horizontal when mounted on the vehicle, and are formed simultaneous with the press-forming the radiator support lower 14. The burling bores are integrally formed with cylindrical protrusions (not shown) that protrude downward.

The retaining bores 28 unitarily engage with elastic bodies (not shown) having the same structure as that of the elastic bodies 26 for non-detachable manner to allow a bottom portion of the radiator main body 20 to be unitarily mounted on the radiator support lower 14 via those elastic bodies. Here, each of the cylindrical protrusions takes a tapered shape with a diameter decreasing downward, thereby allowing the elastic body and the radiator main body 20 to be swingably displaced in a vehicle fore and aft direction, within a predetermined angular range as shown in FIGS. 4A and 4B.

The radiator support lower 14 has a left portion and a right portion, i.e., connecting areas 30 to be connected to the pair of radiator support sides 16 and 18, each of which has two areas provided with support-side connecting portions 32 and 34 placed adjacent to each other in the vehicle fore and aft direction. The radiator support lower 14 is unitarily connected to the lower ends of the pair of radiator support sides 16 and 18 with either one of the support-side connecting portions 32 and 34. As will be clear from FIG. 1B showing the connecting portion 30 on a left hand as viewed in the vehicle fore and aft direction, each of the support-side connecting portions 32 and 34 has four connecting holes 36 located at corner portions of a quadrangular area. Thus, the radiator support lower 14 is unitarily connected to the lower end of the radiator support side 16 by coupling means such as bolts inserted to the four connecting holes 36.

Among the four connecting holes 36 of the respective support-side connecting portions 32 and 34, neighboring holes, i.e., central two holes 36 in the vehicle fore and aft direction, are used in common to the respective support-side connecting portions 32 and 34, that is, placed in an overlapping relation. Thus, both the respective support-side connecting portions 32 and 34 take the form of a structure having a total of six connecting holes 36. The radiator support side 16, shown by a single dot line in FIG. 1B, represents one which is connected to the support side connecting portion 32 on a rear side thereof as viewed in the vehicle fore and aft direction. Further, the radiator support side 16, shown by a broken line in FIG. 1B, represents one which is connected to the support side connecting portion 32 on a front side thereof as viewed in the vehicle fore and aft direction.

Further, as will be apparent from FIG. 1B, each of the retaining bores 28 acting as the lower mounting portions is located in the area located between center positions of each of the respective support-side connecting portions 32 and 34. Meanwhile, the retaining bores 22 acting as the upper mounting portions are formed in the radiator support upper 12 in a following manner. That is, under a condition where the radiator support sides 16 and 18 are fixedly secured to the radiator support upper 12, the bores 22 are positioned close proximity to the centers of the connecting portions, at the lower areas of the radiator support sides 16 and 18 fixed to the support-side connecting portions 32 and 34, in the vehicle fore and aft direction.

Figure 2A:
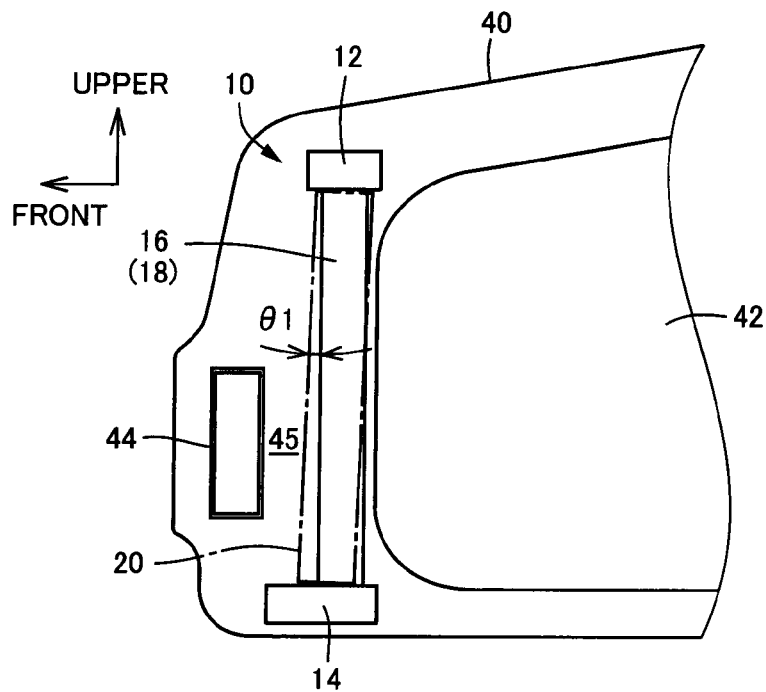
FIGS. 2A and 2B are views illustrating states in which the radiator support lower is connected to radiator support sides in a forward position, with FIG. 2A being a left side view of a vehicle as viewed from a left side thereof and FIG. 2B being a plan view showing a positional relationship between left end portions of a radiator support upper and the radiator support lower located at a left side of the vehicular cooling device supporting apparatus as viewed in a vehicle fore and aft direction.
Figure 2B:
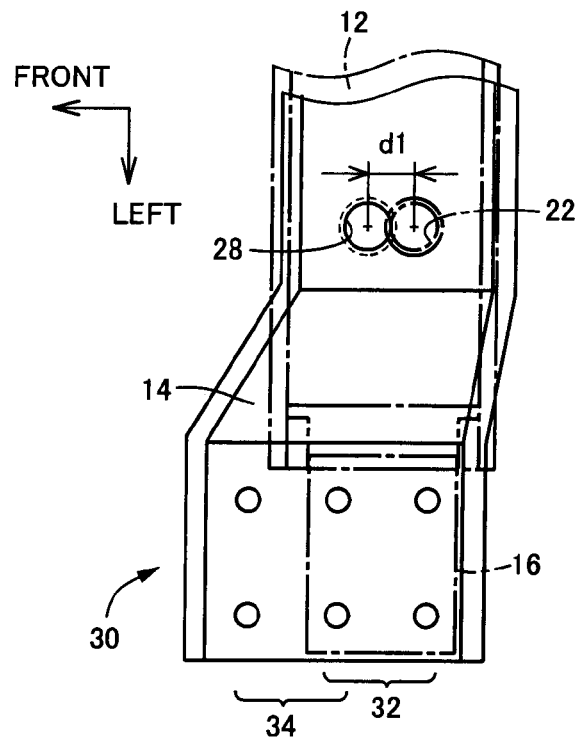

This allows, as shown in FIGS. 2A and 2B, the retaining bores 22 of the upper mounting portions to be located rearward of the retaining bores 28 of the lower mounting portions by a predetermined shift dimension d1 in a forward position where the radiator support lower 14 is connected to the radiator support sides 16 and 18 with the support-side connecting portion 32. In other words, the retaining bores 28 of the lower mounting portions are located at a first position positioned frontward of the retaining bores 22 of the upper mounting portions in the vehicle fore and aft direction.

Figure 3A:
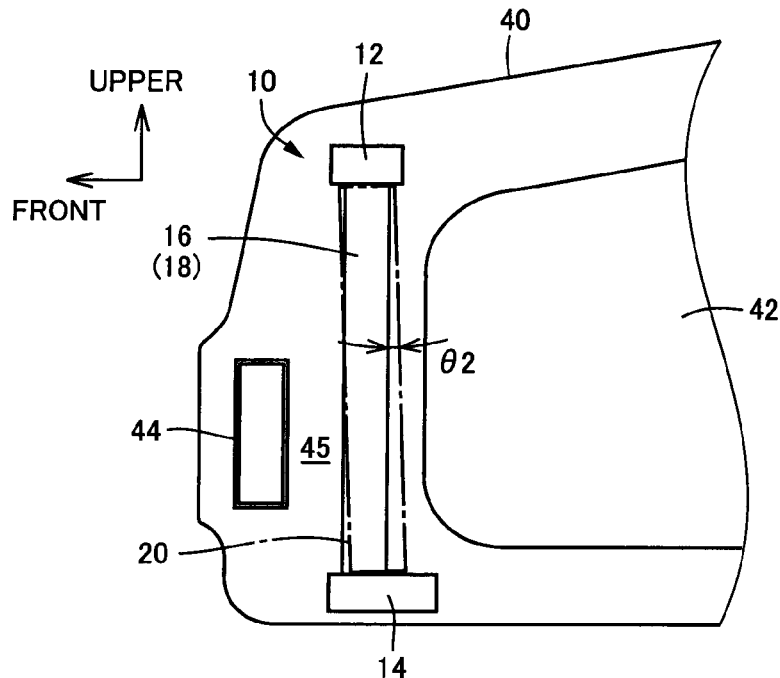
FIGS. 3A and 3B are views illustrating the states in which the radiator support lower is connected to the radiator support sides in a rearward position, with FIG. 3A being a left side view of a vehicle as viewed from a left side thereof and FIG. 3B being a plan view showing the positional relationship between the left end portions of the radiator support upper and the radiator support lower located at a left side of the vehicular cooling device supporting apparatus as viewed in the vehicle fore and aft direction.
Figure 3B:
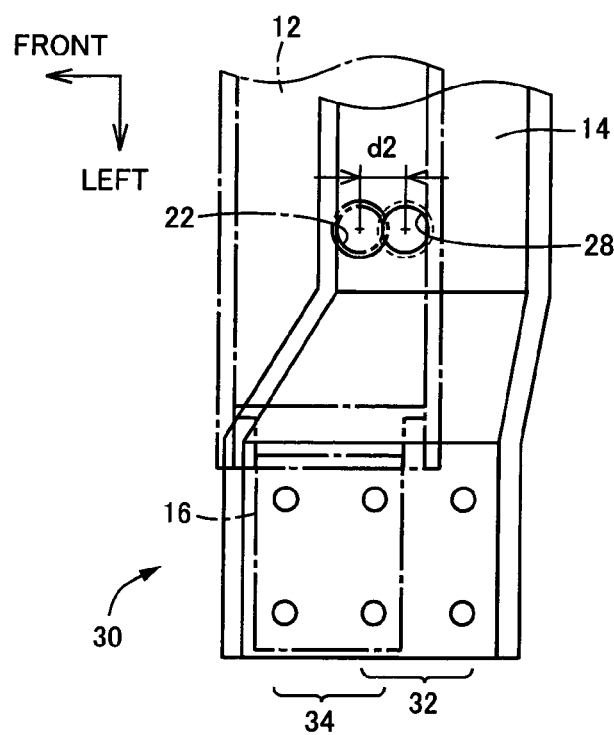

On the contrary, as shown in FIGS. 3A and 3B in a rearward position in which the radiator support lower 14 is connected to the radiator support sides 16 and 18 with the support-side connecting portion 34, the retaining bores 22 of the upper mounting portions are located forward of the retaining bores 28 of the lower mounting portions by a predetermined shift dimension d2. In other words, the retaining bores 28 of the lower mounting portions are located at a second position positioned rearward of the retaining bores 22 of the upper mounting portions in the vehicle fore and aft direction.

FIG. 2B and FIG. 3B are plan views each showing the connecting portions on a left-hand end portion of the vehicular cooling device supporting apparatus 10 as viewed in the vehicle fore and aft direction. For showing a positional relationship between the radiator support upper 12 and the radiator support lower 14, the radiator support lower 14 is indicated by a solid line, with the radiator support side 16 and the radiator support upper 12 being indicated by single dot lines. FIG. 2A and FIG. 3A are side views, as viewed from a left side of the vehicle, each showing a positional relationship among the radiator main body 20 supported by the vehicular cooling device supporting apparatus 10 and indicated by a single dot line, and an engine 42 and a bumper reinforcement 44 disposed in a vehicle body 40.

When the radiator support lower 14 is fixed in the forward position as shown in FIG. 2A, the radiator main body 20 is disposed in a backward inclination with the lower portion placed forward, to enable the engine 42 of large size to be installed. When the radiator support lower 14 is fixed in the rearward position as shown in FIG. 3A, the radiator main body 20 is disposed in the forward inclination with the lower portion placed rearward, to enable the engine 42 of small size to be installed. Also, a large space 45 existing between the bumper reinforcement 44 and the radiator main body 20, can prevent occurrence of damage to the radiator main body 20 upon a vehicle collision at a low speed. FIG. 4A corresponds to FIGS. 2A and 2B, and FIG. 4B corresponds to FIGS. 3A and 3B.

The cylindrical protrusions 22a etc. of the retaining bores 22 and 28 have tapered angles which are determined so as not to cause a plastic deformation on the elastic bodies 26 due to a forcible force acted thereon, both when the radiator main body 20 is mounted in the backward inclination as shown in FIG. 2A and when the radiator main body 20 is mounted in the forward inclination as shown in FIG. 3A. Further, the retaining bores 22 and 28 are placed in layout such that inclining angles θ1 and θ2 in the forward inclination and in the backward inclination with respect to a vehicle normal direction, that is normal direction of the vehicle are approximately equal to each other, that is, the shift dimensions d1 and d2 have the approximately same values. That is, layout positions of the retaining bores 22 and 28 are determined such that the retaining bores 22 of the upper mounting portions are located between the centers of the retaining bores 28 of which positions are displaced in the vehicle fore and aft direction, depending on the forward or first position and the rearward or second position of the radiator support lower 14.

In this way, with ensuring the lower portion of the radiator main body 20 to be displaced by a predetermined shift length (in the order of, for instance, about 35 mm to 45 mm) in the vehicle fore and aft direction, the inclining angles θ1 and θ2 of the radiator main body 20 forward and rearward relative to the normal direction can be made as small as possible. Thus, the tapered angles of the cylindrical protrusions 22a etc. of the retaining bores 22 and 28 can be made as small as possible. The displaced amount of the lower portion of the radiator main body 20 in the vehicle fore and aft direction corresponds to a shift length between the forward position and the rearward position of the radiator support lower 14, and this displaced amount is a sum of the shift dimensions d1 and d2.

Thus, in the vehicular cooling device supporting apparatus 10 of the present embodiment, the radiator support lower 14 has the plural support-side connecting portions 32 and 34 provided in the areas displaced, i.e., spaced from each other in the vehicle fore and aft direction. This can alter the connecting positions of the radiator support lower 14 relative to the radiator support sides 16 and 18 in the vehicle fore and aft direction. Therefore, the radiator support lower 14 can be placed in the forward position as shown in FIG. 2A when the engine 42 has a large size, and it can be placed in the rearward position as shown in FIG. 3A when the engine 42 has a small size. Thus, the layout position of the radiator main body 20 can be altered depending on the engine size. This enables component parts (such as the radiator support upper 12, the radiator support lower 14 and the radiator support sides 16 and 18) to be used in common for altering the layout position of the radiator main body 20 depending on the engine size. Furthermore, placing the radiator main body 20 in the rearward position when the engine 42 has the small size ensures a large volume of space 45 existed between the bumper reinforcement 44 and the radiator main body 20, resulting in a suppressed damage to the radiator main body 20 upon the vehicle collision at the low speed.

Here, it may suffice for the vehicular cooling device supporting apparatus 10 of the present embodiment to be arranged such that the connecting position of the radiator support lower 14 relative to the radiator support sides 16 and 18 can be altered in the vehicular fore and aft direction. Therefore, the present embodiment can be constructed simply with the minimum number of component parts at the low cost, in contrast to the conventional vehicular cooling device supporting apparatus disclosed in Patent Document 1 employing the plurality of bracket groups.

Meanwhile, the retaining bores 28 of the lower mounting portions formed in the radiator support lower 14 have different layout positions relative to the retaining bores 22 depending on whether the radiator support lower 14 is connected to the radiator support sides 16 and 18 at the forward position or at the rearward position. That is, in the former case, the retaining bores 28 are displaced forward of the retaining bores 22 of the upper mounting portions by the shift dimension d1 and, in the latter case, they are displaced rearward of the retaining bores 22 of the upper mounting portions by the shift dimension d2. Therefore, the radiator main body 20 whose upper and lower portions are respectively mounted to the retaining bores 22 and 28 can be varied in placement and inclination, between the backward inclination with the lower portion protruding forward in the normal direction, and the forward inclination with the lower portion protruding rearward in the normal direction. As a result, the present embodiment can adapt to the vehicle without large design modification of the mounting structure such as the retaining bores 22 and 28, as compared with the conventional vehicular radiator supporting apparatus in which the radiator main body 20 is disposed substantially normal with the small inclining angles θ1 and θ2 of with respect to the normal.

That is, in the present embodiment, the upper mounting portions takes the form of the retaining bores 22, having the cylindrical protrusions 22a or the like. The elastic bodies 26 which have the outer circumferential surface formed with annular groove 24 engaged with the cylindrical protrusions 22a are unitarily fitted to the retaining bores 22. The upper portions of the radiator main body 20 are mounted via the elastic bodies 26. The placement and inclination of the radiator main body 20 may be shifted in the backward inclination or the forward inclination depending on a difference of the connecting position between the radiator support lower 14 and the radiator support sides 16 and 18. Here, the cylindrical protrusions 22a having the tapered shapes with the diameter decreasing upward permit the elastic bodies 26 to swingably displace in the vehicle fore and aft direction. As a result, the radiator main body 20 can be favorably mounted onto the retaining bores 22 without causing any trouble, regardless of the placement and inclination variation of the radiator main body 20. In addition, the elastic bodies employed in the usual supporting apparatus in which the radiator main body 20 vertically disposed can be used intact, thus enabling the component parts to be used in common.

In particular, in the present embodiment, the layout positions of the retaining bores 22 and 28 are set to establish the inclining angle in the formula θ1 ® θ2, in other words, the shift dimension in the formula d1 ® d2. This allows the lower portion of the radiator main body 20 to displace by a predetermined shift length in the vehicle fore and aft direction, with minimizing the inclining angles θ1 and θ2 as small as possible with respect to the normal direction. As a result, the cylindrical protrusions 22a of the retaining bores 22 have the taper angels minimized as small as possible to minimize a design modification to the minimal degree, with allowing the elastic bodies 26 to be used in common. Such an advantageous effect related to the upper mounting portions is similarly obtained in the lower mounting portions formed of the retaining bores 28.

Further, in the present embodiment, the radiator support lower 14 have the two connecting areas 30, spaced in the vehicle fore and aft direction, which are respectively formed with the support-side connecting portions 32 and 34, and can be connected to the radiator support sides 16 and 18 at one of the two positions i.e. the forward position or the rearward position displaced in the vehicle fore and aft direction. Here, the retaining bores 28 of the lower mounting portion are provided in the areas located between the center positions of the support-side connecting portions 32 and 34 placed in the two areas displaced in the vehicle fore and aft direction. Therefore, it may suffice for the layout position of the retaining bores 22 of the upper mounting portions to be positioned near the center positions of the radiator support sides 16 and 18 connected to those support-side connecting portions 32 and 34 in the vehicle fore and aft direction.

With such an arrangement, with the radiator support lower 14 connected to the radiator support sides 16 and 18 in the forward position, the retaining bores 22 of the upper mounting portions are located rearward of the retaining bores 28 of the lower mounting portions. In addition, with the radiator support lower 14 connected to the radiator support sides 16 and 18 in the rearward position, the retaining bores 22 of the upper mounting portions are located forward of the retaining bores 28 of the lower mounting portions. Thus, the positional relationship of the retaining bores 22 and 28 can be easily set, and the vehicular cooling device supporting apparatus 10 can be compactly constructed in the vehicle fore and aft direction.

In the foregoing description, while the present invention has been described above in detail with reference to the embodiment shown in the drawings. However, the present invention is intended that the embodiment described be considered only as illustrative of the present invention and that the present invention can be embodied in various modifications and improvements based on knowledge of those skilled in the art.

What is claimed is:

1. A vehicular cooling device supporting apparatus, comprising:
   a radiator support upper disposed in a vehicle lateral direction and having an upper mounting portion for fixing an upper portion of a cooling device;
   a radiator support lower placed below the radiator support upper so as to extend in the vehicle lateral direction and having a lower mounting portion for fixing a lower portion of the cooling device; and
   a pair of radiator support sides vertically extended and spaced in the vehicle lateral direction so as to straddle between the radiator support upper and the radiator support lower for unitarily connecting the radiator support upper and the radiator support lower;
   the vehicular cooling device supporting apparatus having an approximately square-shaped space surrounded by the radiator support upper, the radiator support lower and the pair of radiator support sides for supporting therein the cooling device,
   wherein the radiator support lower has a pair of connecting areas, connected to the pair of radiator support sides, each having a plurality of support-side connecting portions to be connected to a lower end of the radiator support side at one of plural positions displaced in a vehicle fore and aft direction;
   the lower mounting portion is disposed (i) to have a first position located forward of the upper mounting portion in the vehicle fore and aft direction when the radiator support lower is connected to the radiator support sides in a frontmost position in the vehicle fore and aft direction, and (ii) to have a second position located rearward of the upper mounting portion in the vehicle fore and aft direction when the radiator support lower is connected to the radiator support sides in a rearmost position in the vehicle fore and aft direction;
   at least one of the upper mounting portion and the lower mounting portion is a retaining bore having a cylindrical protrusion protruding in a vehicle normal direction,
   an elastic body having an outer circumferential surface and an annular groove unitarily engaging with the cylindrical protrusion, the cooling device being mounted to the radiator support upper and the radiator support lower via the elastic body; and
   the cylindrical protrusion having a tapered shape and a diameter decreasing in a direction opposite to the cooling device, thereby allowing the elastic body to swingably displace in the vehicle fore and aft direction as a placement and an inclination of the cooling device change due to a difference in a connecting position between the radiator support lower and the radiator support sides.

2. The vehicular cooling device supporting apparatus according to claim 1, wherein
   the plurality of support-side connecting portions include two sets of plural connecting holes placed adjacent to each other in the vehicle fore and aft direction, which allow the radiator support lower to be connected to lower ends of the radiator support sides at one of two positions displaced in the vehicle fore and aft direction; and
   the lower mounting portion is located between a center position of a first set of the plural connecting holes and a center position of a second set of the plural connecting holes in the vehicle fore and aft direction.

3. The vehicular cooling device supporting apparatus according to claim 1, wherein
   the plurality of support-side connecting portions include two sets of plural connecting holes placed adjacent to each other in the vehicle fore and aft direction, which allow the radiator support lower to be connected to lower ends of the radiator support sides at one of two positions displaced in the vehicle fore and aft direction; and the lower mounting portion is located between a center position of a first set of the plural connecting holes and a center position of a second set of the plural connecting holes in the vehicle fore and aft direction.

4. The vehicular cooling device supporting apparatus according to claim 1, wherein the cooling device has a backward inclination, a lower portion of the cooling device protruding forward with respect to a vehicle normal direction when the lower mounting portion is located at a first position, and has a forward inclination, the lower portion of the cooling device retracted rearward with respect to the vehicle normal direction when the lower mounting portion is located at a second position.

5. The vehicular cooling device supporting apparatus according to claim 4, wherein the forward inclination and backward inclination of the cooling device are inclined at equal angles.

6. The vehicular cooling device supporting apparatus according to claim 1, wherein the elastic body is provided with a head portion having large diameter and a neck portion having small diameter defined by the annular groove, the neck portion is engaged with the cylindrical protrusion, and the head portion is protruded from the cylindrical protrusion.

7. The vehicular cooling device supporting apparatus according to claim 2, wherein in the support-side connecting portion, a part of the first set of the plural connecting holes and a part of the second set of the plural connecting holes are used in common.

8. The vehicular cooling device supporting apparatus according to claim 3, wherein in the support-side connecting portion, a part of the first set of the plural connecting holes and a part of the second set of the plural connecting holes are used in common.

* * * * *